United States Patent
Sharma et al.

(10) Patent No.: US 12,458,265 B2
(45) Date of Patent: Nov. 4, 2025

(54) SYSTEM AND METHOD FOR PREDICTION AND CONTROL OF ATTENTION DEFICIT HYPERACTIVITY (ADHD) DISORDERS

(71) Applicants: Abhishek Sharma, Jaipur (IN); Ahmed I. Alutaibi, Majma'ah (SA); Mohammed Alshehri, Majma'ah (SA); Sunil Kumar Sharma, Majma'ah (SA); Prateek Jain, Ahmedabad (IN); Vikas Bajpai, Jaipur (IN)

(72) Inventors: Abhishek Sharma, Jaipur (IN); Ahmed I. Alutaibi, Majma'ah (SA); Mohammed Alshehri, Majma'ah (SA); Sunil Kumar Sharma, Majma'ah (SA); Prateek Jain, Ahmedabad (IN); Vikas Bajpai, Jaipur (IN)

( * ) Notice: Subject to any disclaimer, the term of this patent is extended or adjusted under 35 U.S.C. 154(b) by 286 days.

(21) Appl. No.: 18/367,459

(22) Filed: Sep. 13, 2023

(65) Prior Publication Data

US 2024/0050006 A1    Feb. 15, 2024

(51) Int. Cl.
| | |
|---|---|
| *A61B 5/16* | (2006.01) |
| *A61B 5/00* | (2006.01) |
| *G16H 20/00* | (2018.01) |
| *G16H 50/20* | (2018.01) |

(52) U.S. Cl.
CPC ............ *A61B 5/165* (2013.01); *A61B 5/7282* (2013.01); *A61B 5/74* (2013.01); *G16H 20/00* (2018.01); *G16H 50/20* (2018.01)

(58) Field of Classification Search
CPC ......... A61B 5/165; A61B 5/168; A61B 5/372; A61B 5/4082; A61B 5/4088; A61B 5/4803; A61B 5/7264; A61B 5/7267; A61B 5/7282; A61B 5/74; G16H 20/00; G16H 20/70; G16H 50/20
See application file for complete search history.

(56) References Cited

U.S. PATENT DOCUMENTS

2020/0380376 A1 * 12/2020 Jain ................. H04L 63/101

\* cited by examiner

*Primary Examiner* — Michael T Rozanski
(74) *Attorney, Agent, or Firm* — Maschoff Brennan (57) ABSTRACT

The system comprises a prediction module (1) equipped with artificial intelligence to predict neurological disorders in an individual patient and identify a level of neurological disorders; a central processing unit (2) to detect triggering events and circumstances due to which the neurological disorders trigger in an individual patient upon receiving real-time behavior information data generated by a playing ball (3) of an individual patient and distinguish between a normal behavior and a neurological disorders behavior; an alert module (4) to alert the individual patient upon determining neurological disorders behavior; and an entertainment platform (5) to entertain and engage the individual patient with a specific set of activities assigned according to detected triggering events and circumstances upon determining the neurological disorders behavior, wherein a specific set of activities includes listening to music, playing games, and talking to an AI chatbot.

20 Claims, 5 Drawing Sheets

SYSTEM AND METHOD FOR PREDICTION AND CONTROL OF ATTENTION DEFICIT HYPERACTIVITY (ADHD) DISORDERS

FIELD OF THE INVENTION

The present disclosure relates to a machine learning-based smart healthcare system and method for automatic prediction of attention-deficit/hyperactivity disorder (ADHD) using combinations of multiple established machine learning techniques like neural networks and SVM models on the ADHD200 dataset and exploring the field of neuroscience. In more detail, the system and method for the automatic prediction of neurological disorders and monitoring and controlling unusual behavior of the patient.

BACKGROUND OF THE INVENTION

Attention Deficit/Hyperactivity Disorder (ADHD) is a pervasive neurodevelopmental disorder affecting the younger population. However, ADHD also affects numerous adults. People diagnosed with ADHD generally experience inattention (unable to focus properly), hyperactivity (excessive movement that is not fit for sitting), and impulsive behaviors (may act without thinking about what the result will be). Mental disorder symptoms include difficulty in focusing, instant irritation, easy distraction, and other abnormal mental situations. It is a critical issue of mental health and it is being challenged for the next generation. Nowadays, it is required to cure the mental disorder efficiently without any constraints of awareness, time, and availability of medical experts. Remote connectivity between medical experts and patients is a trendy solution in terms of better and more advanced facilities for patients.

In a particular scenario, the demand for remote healthcare is getting more promoted than ever. The present IoMT framework for healthcare encourages health centers to ameliorate the quality of treatment by focusing on overall optimization in terms of cost also. The ADHD diagnosis is required to be updated as the living style is being sophisticated and patients need the treatment instantly without any basic hurdles to get the treatment. Hence, an ADHD care framework is required to be proposed for smart healthcare, in which patients will get support from medical representatives without wastage of time and treatment will be reliable as the patient can approach the experts remotely and time won't be constrained.

According to survey analysis, overall, 2.2% of the average prevalence of ADHD has been estimated in children and adolescents (aged<18 years). Many studies have been conducted based on machine learning to diagnose ADHD effectively. To contribute to the research in diagnosing ADHD, the ADHD-200 consortium globally held the ADHD-200 competition backed by the International Neuroimaging Data-sharing Initiative (INDI). The evolution of this research is considered when statistical analysis of brain surfaces has been done using a Gaussian random field. Adjacently, fMRI images have been taken as a resource for ADHD detection in terms of technology advancements. In continuation, EEG signals were being monitored for gesture recognition to justify the changes in brain signals. The research work had been done to optimize the signal parameters to make a precise framework. Different features were extracted for chasing the accuracy of ADHD-level justifications. But, it is required to form a reliable framework, which confirms the levels of mental disorders.

The existing system uses SVM, explicitly addressing the imbalanced dataset problem of ADHD-200. The positive and negative empirical errors are handled explicitly and separately by using a three-objective SVM. After trying many traditional classifiers and comparing them with deep learning-based CNN VGG 16, the maximum accuracy was achieved in CNN VGG 16 model. The earlier presented system demonstrates the use of functional-Magnetic Resonance Imaging for the diagnosis of ADHD using multiple machine-learning models on the publicly available ADHD-200 dataset. The results show the classification of ADHD and control subjects, differentiate between the functional connectivity of these two categories and evaluate the significance of phenotypic data to predict ADHD. They have used SVM to classify ADHD after calculating functional connectivity, performing elastic net-based feature selection, and integrating phenotypic information. In the presented system, multiclass classification has been performed using a hierarchical extreme learning machine (H-ELM) classifier. They have also compared the performance of the H-ELM classifier with that of a support vector machine and primary extreme learning machine (ELM) classifiers for cortical MRI data from 159 ADHD patients of the ADHD-200 dataset. This system achieved an accuracy of 61% by using SVM with recursive feature elimination (RFE-SVM). Overall, they achieved high multiclass classification accuracy by combining RFE-SVM with H-ELM classifiers for s-MRI data. After doing an overview of many studies on ADHD prediction, also found that SVM and ANN are the most effective classification techniques.

The system proposes a Multichannel Deep Neural Network Model, which has delivered a promising result with an accuracy of 95% on the combined data of connectome and phenotypic data of the ADHD-200 dataset. Furthermore, the multichannel deep neural network model improved ADHD detection performance considerably compared with a single scale by fusing the multi-scale brain connectome data. The system establishes that s-MRI data can effectively differentiate between ADHD and controls. In this system, deep learning neural networks have been used to determine the similarities in neuroanatomical changes in the brains of children with ADHD and adults with ADHD. Not only this, but this system also demonstrates the effective use of neural networks as classification models to test hypotheses about developmental continuity and predict ADHD. The system proposes a deep neural network-multilayer perceptron to diagnose psychotic disorder diseases (PDD). The prior systems evidence that neural networks can be effective in ADHD prediction.

However, presently, the mental disorder is being cured by psychiatrists after taking counseling and discussing it with them. Based on medical and personal histories, experts would be able to get the level of mental disorders and medical treatments are being provided accordingly. There is a disadvantage of this convention process that the patient may not be able to consult with an expert sometimes and treatment wouldn't be proper and reliable. Many times, the experts are not available in a particular area. So, the problem would be critical in those cases. In view of the foregoing discussion, it is portrayed that there is a need to have a machine learning-based smart healthcare system and method for the automatic prediction of neurological disorders and monitoring and controlling unusual behavior of the patient.

SUMMARY OF THE INVENTION

The present disclosure seeks to provide a machine learning-based smart healthcare system and method for monitoring behavioral patterns in individuals with neurological disorders. The system attempts to explore methods to diagnose ADHD using combinations of multiple established machine learning techniques like neural networks and SVM models on the ADHD200 dataset and explore the field of neuroscience. In this system, multiclass classification is performed on phenotypic data using an SVM model. The better results have been analyzed on the phenotypic data compared to other supervised learning techniques like Logistic regression, KNN, AdaBoost, etc. In addition, neural networks have been implemented on functional connectivity from the MRI data of a sample of 40 subjects provided to achieve high accuracy without prior knowledge of neuroscience. It is combined with the phenotypic classifier using the ensemble technique to get a binary classifier. It is further trained and tested on 400 out of 824 subjects from the ADHD200 data set and achieved an accuracy of 92.5% for binary classification The training and testing accuracy has been achieved up to 99% using an ensemble classifier. This system has been calibrated and tested on a significant ADHD-200 dataset with sufficient subjects with multiple conditions. Phenotypic and fMRI images are taken for preprocessing, conditioning, and classifying steps for ADHD detection. Multiple features are extracted for classification. Data has been segregated as per the standards of the analysis. This framework is portrayed as a virtual effective model, which would be the real-time framework for instant ADHD diagnosis. The research contributions are judicially reported, which depict the advancement in recent technology for ADHD detection.

In an embodiment, a machine learning-based smart healthcare system for monitoring behavioral patterns in individuals with neurological disorders is disclosed. The system includes a prediction module equipped with artificial intelligence for recognizing or predicting Attention-Deficit Disorder (ADD), Attention-Deficit/Hyperactivity Disorder (ADHD), and autism spectrum disorder (ASD) using machine learning and identifying a level of ADD/ADHD/Autism by using an Internet of Things (IoT) and activity recognition. The system further includes a central processing unit connected to the prediction module for detecting triggering events and circumstances due to which the ADD/ADHD/Autism triggers in an individual patient upon receiving real-time behavior information data generated by a playing ball of an individual patient and distinguishing between normal behavior and ADD/ADHD/Autism behavior. The system further includes an alert module in association with the central processing unit for alerting an individual patient upon determining upcoming unusual or ADD/ADHD/Autism behavior using artificial intelligence, IoT, and body area network, wherein the upcoming unusual or ADD/ADHD/Autism behavior is predicted by identifying a rapid change in body parameters of the patient. The system further includes an entertainment platform in connection with the central processing unit and alert module for entertaining and engaging the individual patient with a specific set of activities assigned according to the detected triggering events and circumstances upon the prediction of upcoming unusual or ADD/ADHD/Autism behavior, wherein a specific set of activities includes listening music, playing games, talking to AI chatbot.

In an embodiment, a machine learning-based smart healthcare method for monitoring behavioral patterns in individuals with neurological disorders is disclosed. The method includes predicting neurological disorders in an individual patient using a machine learning technique.

The method further includes identifying a level of neurological disorders by using an Internet of Things (IoT) and activity recognition.

The method further includes detecting triggering events and circumstances due to which the neurological disorders trigger in an individual patient upon receiving real-time behavior information data generated by a playing ball (3) of an individual patient and distinguishing between a normal behavior and a neurological disorders behavior using a central processing unit (2), wherein detecting triggering events using the playing ball (3) comprising the steps of: providing a playing ball (3) with a minimum of 8 distinct colored faces, each face being configured to illuminate in response to specific audio command inputs; capturing audio commands via an integrated microphone within the playing ball (3); interpreting the audio commands to activate a set of activities, wherein the activities comprise causing the playing ball (3) to jump, locomoting the playing ball (3) using an embedded accelerometer, replying to questions posed by the user, and engaging in verbal interactions with the user; employing a speaker within the playing ball (3) to provide verbal responses to questions and engage in dialogues: utilizing an embedded pressure sensor within the playing ball (3) to measure the amount of force applied by the user, thereby facilitating the analysis of the user's behavioral patterns; and generating real-time behavior information data through an integrated processor, and transmitting the data to an alert module (4) using either a Wi-Fi module or Bluetooth connectivity.

The method further includes alerting the individual patient upon determining neurological disorders behavior using an artificial intelligence, an IoT, and a body area network, wherein neurological disorders behavior is determined by identifying a rapid change in body parameters of the patient.

The method further includes entertaining and engaging the individual patient with a specific set of activities assigned according to detected triggering events and circumstances upon determining the neurological disorders behavior, wherein a specific set of activities includes listening to music, playing games, and talking to an AI chatbot.

An object of the present disclosure is to develop an ADHDcare framework iPAL with fMRI and phenotypic images for smart healthcare, where the patients can approach medical experts at remote locations.

Another object of the present disclosure is to Key-point features have been extracted and a precise classifier has been used for ADHD diagnosis with prescribed protocols of data analysis.

Another object of the present disclosure is to train Multiple classifiers for analysis of the optimized model, which provides reliable results for mental disorder justifications.

Another object of the present disclosure is to explore the efficient supervised learning techniques in the field of neuroscience and achieve maximum accuracy while at the same time also combining the results of both kinds of data, i.e., Phenotypic and MRI data.

Yet another object of the present invention is to deliver an expeditious and cost-effective methodology, which results in a precise justification of mental disorders from live phenotypic and fMRI images.

To further clarify the advantages and features of the present disclosure, a more particular description of the invention will be rendered by reference to specific embodiments thereof, which are illustrated in the appended drawings. It is appreciated that these drawings depict only typical embodiments of the invention and are therefore not to be considered limiting of its scope. The invention will be described and explained with additional specificity and detail in the accompanying drawings.

BRIEF DESCRIPTION OF FIGURES

These and other features, aspects, and advantages of the present disclosure will become better understood when the following detailed description is read concerning the accompanying drawings in which like characters represent like parts throughout the drawings, wherein.

Further, skilled artisans will appreciate those elements in the drawings are illustrated for simplicity and may not have necessarily been drawn to scale. For example, the flow charts illustrate the method in terms of the most prominent steps involved to help to improve understanding of aspects of the present disclosure. Furthermore, in terms of the construction of the device, one or more components of the device may have been represented in the drawings by conventional symbols, and the drawings may show only those specific details that are pertinent to understanding the embodiments of the present disclosure so as not to obscure the drawings with details that will be readily apparent to those of ordinary skill in the art having the benefit of the description herein.

DETAILED DESCRIPTION

To promote an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates.

It will be understood by those skilled in the art that the foregoing general description and the following detailed description are exemplary and explanatory of the invention and are not intended to be restrictive thereof.

Reference throughout this specification to "an aspect", "another aspect" or similar language means that a particular feature, structure, or characteristic described in connection with the embodiment is included in at least one embodiment of the present disclosure. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skill in the art to which this invention belongs. The system, methods, and examples provided herein are illustrative only and not intended to be limiting.

Embodiments of the present disclosure will be described below in detail concerning the accompanying drawings.

Figure 1:
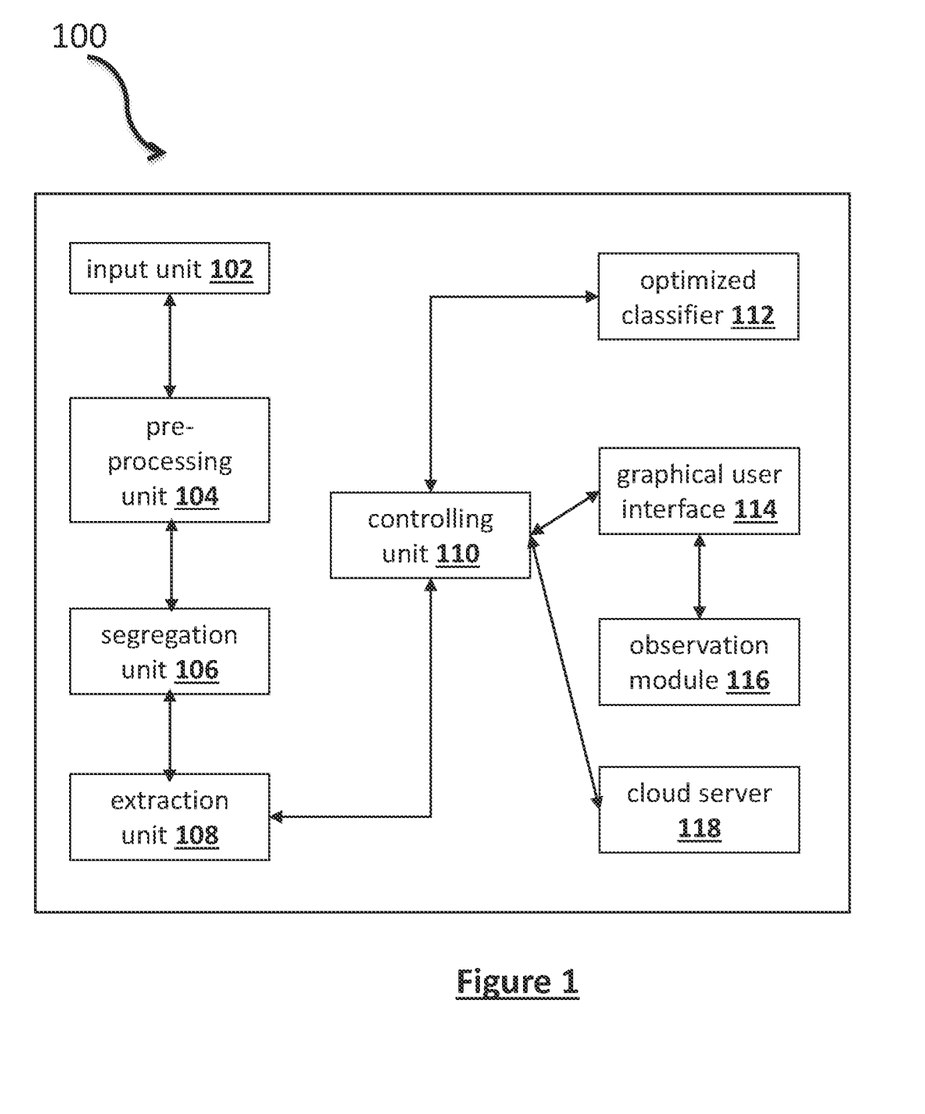
FIG. 1 illustrates a block diagram of a prediction unit for the automatic prediction of neurological disorders and monitoring and controlling unusual behavior of the patient in accordance with an embodiment of the present disclosure.

Referring to FIG. 1, a block diagram of a machine learning-based smart healthcare system for the automatic prediction of neurological disorders and monitoring and controlling unusual behavior of the patient is illustrated in accordance with an embodiment of the present disclosure. System 100 includes an input unit (102) for importing phenotypic and fMRI image data and dividing healthy and patient data.

In an embodiment, a pre-processing unit (104) is coupled to the input unit (102) for filtering noise from the imported phenotypic and fMRI image data.

In an embodiment, a segregation unit (106) is coupled to the pre-processing unit (104) for segregating images from noise data and checking whether data is segregated or not, and if not, segregating data for refiltering.

In an embodiment, an extraction unit (108) is coupled to the segregation unit (106) for extracting a set of features by applying logistic regression and examining the coefficients thereby a probabilistic and statistical analysis is performed to extract the ROIs, i.e., voxels that are temporarily correlated and are active, wherein the probabilistic and statistical analysis is preferably an Independent Component Analysis (ICA).

In an embodiment, a controlling unit (110) is coupled to the extraction unit (108) for measuring the functional connectivity biomarkers using the correlation connectivity measure in the form of correlation matrices, wherein the functional connectivity refers is calculated using the standard correlation measures.

In an embodiment, an optimized classifier (112) is coupled to the controlling unit (110) for classifying a real-time fMRI and phenotypic data into a non-neurological disorders and neurological disorders category and early prediction of attention-deficit/hyperactivity disorder (ADHD) and its level.

In another embodiment, the fMRI data is processed using the Neural Network, and the phenotypic are processed using the classifier, wherein the correlation matrix developed using functional connectivity as the connectivity biomarker is used as input data for the neural network.

In another embodiment, the inactive/noisy voxels are removed and time series using a fit transform method is extracted to obtain functional connectivity, wherein each voxel has some fMRI signal associated with it, which is a blood-oxygen-level-dependent (BOLD) signal and plotting the signals of a voxel against the time is called a time series, wherein the time series provide further functional connectivity computation data, potentially allowing machine learning applications.

In another embodiment, the optimized classifier (112) is developed using the functional connectivity biomarkers, wherein the functional connectivity refers to undirected coupling strength between voxels or regions, usually calculated using the standard correlation measures.

In one embodiment, a graphical user interface (114) is having an interactive module to select the activity and engage the user.

In one embodiment, an observation module (116) is coupled to the graphical user interface (114) to analyze a behavioral pattern using a learning technique and progress in the activity in which the user is engaged for early recognition of trigger/panic moments in such users to attention/support.

In another embodiment, a device is used for identifying ADD/ADHD/Autism symptoms using an information and communication technology comprising a camera for capturing brain images. In one embodiment, a plurality of sensors is deployed for monitoring a set of activities of a user to analyze and distinguish between normal behavior and ADD/ADHD/Autism behavior. In one embodiment, a communication device is used for ensuring wireless connection with the system for the detection, recognition, and log of behavioral patterns to prevent and detect ADD/ADHD/Autism at an early level using Artificial Intelligence, IoT, and Body Area Networks.

In another embodiment, a cloud server (118) is used for storing the classified fMRI and phenotypic data into a non-neurological disorders and neurological disorders category and used biomarkers for early prediction, which is accessed in future predictions through the medical experts and patients for similar cases, wherein the cloud server (118) further stores ADHD-200 dataset consists of two types of data, the personal characteristic data and the MRI (Magnetic Resonance Image) data consisting of a resting-state functional magnetic resonance image (rs-fMRI) and a structural magnetic resonance image (s-MRI).

In another embodiment, the data is extracted for each subject and then concatenated to form a distinguished dataset for input data, wherein the phenotypic dataset is analyzed further for a plurality of subjects and features, namely ScanDir ID, Site, Gender, Age, Handedness, ADHD, ADHD Measure, Inattentive, Hyper/Impulsive, IQ Measure, Verbal IQ, Performance IQ, Full4 IQ, Med Status, QC_Athena, and QC_NIAK, leading to the elimination of the features containing more than 60% null or not defined values, followed by dropping the remaining rows with null values from the dataset, wherein after cleaning the data, half of the entries and 14 features, namely ScanDir ID, Site, Gender, Age, ADHD, ADHD Measure, Inattentive, Hyper/Impulsive, IQ Measure, Verbal IQ, Performance IQ, Full4 IQ, QC_Athena and QC_NIAK, are left to be used for further analysis.

In another embodiment, the rsfMRI data is in the form of a 4D nifti image file with noise variables removed, wherein in a 4D nifti image, the first three dimensions represent the three coordinates of a 3D space, i.e., x, y, and z, and the 4th dimension represents time, wherein the 4D image is a collection of several 3D images corresponding to each unit of time such that the 3D image represents voxels, just like a 2D image represents pixels.

In another embodiment, the fit transform method is used to extract the time series, which is further used to obtain functional connectivity upon removing the noisy voxels and extracting the ROIs.

In another embodiment, the mapping of the functional connectivity matrices onto a brain image where each node represents an ROI and edges represent the time-synchronized connectivity between the ROIs with edge strength of more than 80% to obtain the functional connectivity maps or functional connectome.

In another embodiment, a K-Nearest Neighbour is used for classification, in which the gap distance is calculated between the current point and the selected point in the K-Nearest Neighbour technique thereby the distances are added and sorted in ascending order, and finally, the top K entries are selected as nearest neighbors and are further used for determining the class of the current point, wherein a Support vector machine is employed to detect a hyperplane in an N-dimensional space that classifies data points.

In another embodiment, the ANN (Artificial neural network) is used for training the classifier, wherein a Sequential Neural Network is trained as the ANN, wherein the Sequential Neural Network is having an input size of thirteen dimensions and five dense layers are added with dimension and activation functions selected from eleven and 'relu', nine and 'relu', seven and 'relu', five and 'relu', and lastly, four and 'sigmoid', wherein the Sequential Neural Network model is compiled using loss function as 'categorical_crossentropy', optimizer as adam, and metric of accuracy, wherein after training the neural network model with a max epoch count of one hundred, the prediction is made, and the result is converted into an array back from One-Hot-Encoded format.

In machine learning and specifically in neural networks, a loss function (also known as a cost function or objective function) is a method used to measure how well the model is performing or how much error there is between the model's predictions and the actual data. When training a model, the goal is to minimize the value of the loss function. The loss function quantifies the disparity between the predicted value (output of the model) and the actual value (the truth or the target). There are many different types of loss functions, and the choice of loss function depends on the specific problem.

In another embodiment, the Sequential Neural Network further has an input size of 210 neurons, and seven dense layers are used having dimensions and activation function as one hundred and five and 'relu', fifty-two and 'relu', twenty-six and 'relu', thirteen and 'relu', six and 'relu', three and 'relu', and lastly, two and 'sigmoid'.

In another embodiment, for both the fMRI and the phenotypic, the features are processed through a Min-Max Scaler separately and the diagnosis of ADHD is converted into binary form, whereas the phenotypic file had ADHD of four types.

In another embodiment, the SVM is optimized using Grid Search to predict best-fit parameters.

In another embodiment, the method further comprises providing a learning platform for providing entertainment for the early community having ADD/ADHD/Autism.

In another embodiment, the entertainment platform (5) assigns a specific set of entertaining and engaging activities to the individual patient upon predicting triggering events and circumstances that predict the onset of unusual or ADD/ADHD/Autism behavior in the individual patient, wherein the entertainment platform (5) further comprises an evaluation module associated to assess the effectiveness of the assigned activities in managing the symptoms of ADD/ADHD/Autism in the individual patient based on the patient's engagement and response to the assigned activities; and a feedback module coupled with the evaluation module, wherein the feedback module is configured to adjust the assigned activities based on the effectiveness assessed by the evaluation module.

In another embodiment, the triggering events and circumstances include environmental factors, emotional states of the individual patient, or specific activities the patient is engaged in.

Figure 2:
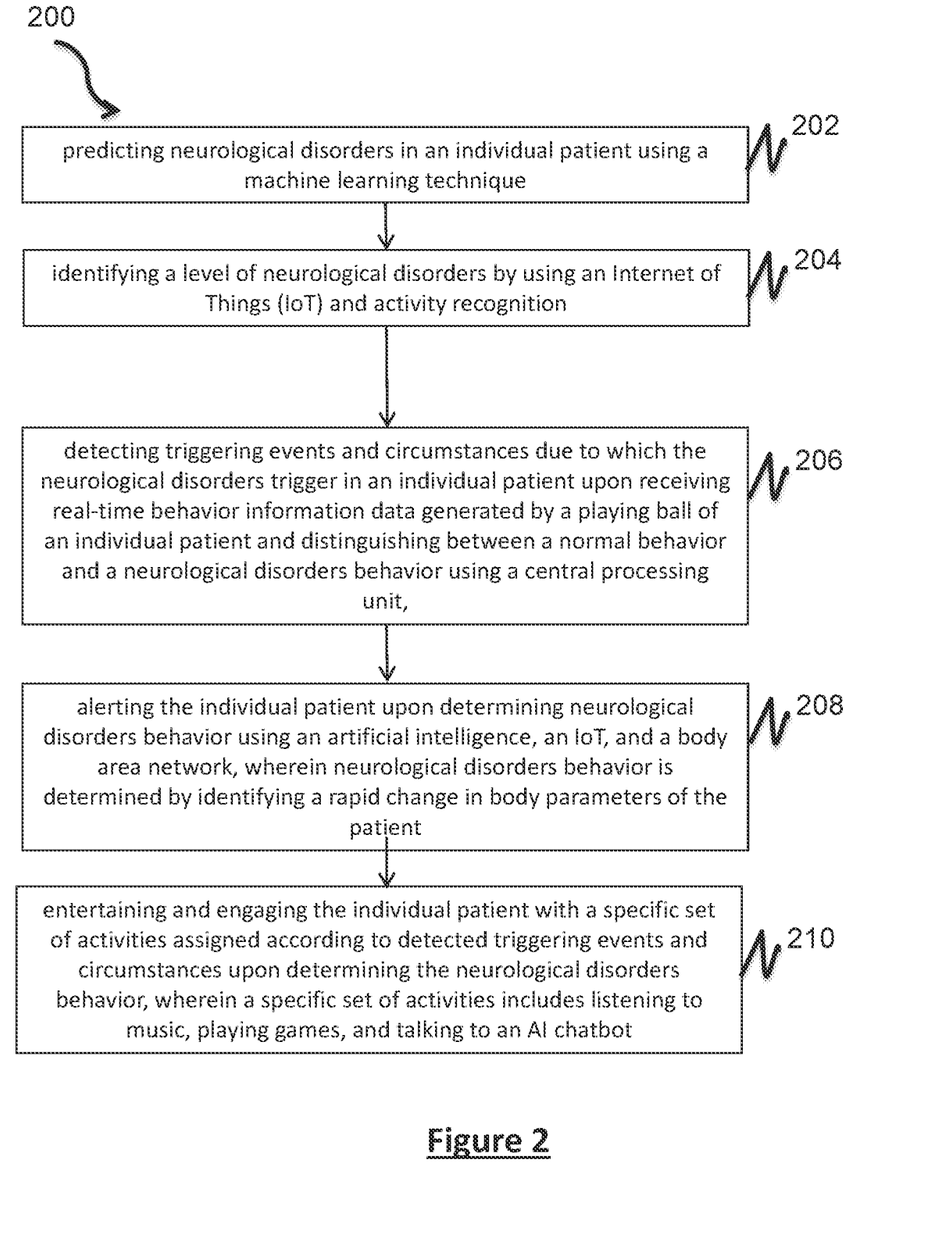
FIG. 2 illustrates a flow chart of a machine learning-based smart healthcare method for monitoring behavioral patterns in individuals with neurological disorders to identify triggering events in accordance with an embodiment of the present disclosure.

FIG. 2 illustrates a flow chart of a machine learning-based smart healthcare method for monitoring behavioral patterns in individuals with neurological disorders in accordance with an embodiment of the present disclosure. At step 202, method 200 includes predicting neurological disorders in an individual patient using a machine learning technique.

At step 204, method 200 includes identifying a level of neurological disorders by using an Internet of Things (IoT) and activity recognition.

At step 206, method 200 includes detecting triggering events and circumstances due to which the neurological disorders trigger in an individual patient upon receiving real-time behavior information data generated by a playing ball (3) of an individual patient and distinguishing between a normal behavior and a neurological disorders behavior using a central processing unit (2), wherein detecting triggering events using the playing ball (3) comprising the steps of providing a playing ball (3) with a minimum of 8 distinct colored faces, each face being configured to illuminate in response to specific audio command inputs. Then, capturing audio commands via an integrated microphone within the playing ball (3). Then, interpreting the audio commands to activate a set of activities, wherein the activities comprise causing the playing ball (3) to jump, locomoting the playing ball (3) using an embedded accelerometer, replying to questions posed by the user, and engaging in verbal interactions with the user. Then, employing a speaker within the playing ball (3) to provide verbal responses to questions and engage in dialogues. Then, utilizing an embedded pressure sensor within the playing ball (3) to measure the amount of force applied by the user, thereby facilitating the analysis of the user's behavioral patterns. Thereafter, generating real-time behavior information data through an integrated processor, and transmitting the data to an alert module (4) using either a Wi-Fi module or Bluetooth connectivity.

At step 208, method 200 includes alerting the individual patient upon determining neurological disorders behavior using an artificial intelligence, an IoT, and a body area network, wherein neurological disorders behavior is determined by identifying a rapid change in body parameters of the patient.

At step 210, method 200 includes entertaining and engaging the individual patient with a specific set of activities assigned according to detected triggering events and circumstances upon determining the neurological disorders behavior, wherein a specific set of activities includes listening to music, playing games, and talking to an AI chatbot.

In another embodiment, the neurological disorders are selected from a group of Attention-Deficit Disorder (ADD), Attention-Deficit/Hyperactivity Disorder (ADHD), and autism spectrum disorder (ASD), wherein the neurological disorders recognition or prediction comprises importing a phenotypic and fMRI image data and dividing healthy and patient data. Then, filtering noise from the imported phenotypic and fMRI image data and storing the classified fMRI and phenotypic data into a non-neurological disorders and neurological disorders category in a cloud server (118) and using biomarkers for future predictions through the medical experts and patients for similar cases. Then, removing inactive/noisy voxels and extracting time series using a fit transform method to obtain functional connectivity after extracting the ROIs. Then, segregating images from noise data and checking whether data is segregated or not, and if not, segregating data for refiltering. Then, extracting a set of features by applying logistic regression and examining the coefficients thereby a probabilistic and statistical analysis is performed to extract the ROIs, i.e., voxels that are temporarily correlated and are active, wherein the probabilistic and statistical analysis is preferably an Independent Component Analysis (ICA), wherein the set of features is selected from subject, site, age, sex, and gender. Then, measuring the functional connectivity biomarkers using the correlation connectivity measure in the form of correlation matrices, wherein the functional connectivity is calculated using the standard correlation measures, wherein at least three connectivity measures are considered to calculate the functional connectivity biomarkers including correlation, partial correlation, and tangent, in which, first, the accuracies for these three measures are compared and a correlation and tangent are found to be similar and accurate enough. Thereafter, developing an optimized classifier (112) using the functional connectivity biomarkers for classifying a real-time fMRI and phenotypic data into the non-neurological disorders and neurological disorders category and early prediction of neurological disorders and its level, wherein the fMRI data is processed using a Neural Network, and the phenotypic are processed using a SVM (subject vector machine).

In another embodiment, determining the neurological disorder upon detecting triggering events using visual presentation comprises presenting an artificial agent on a display device to a subject, wherein the artificial agent is configured to produce a stimulus change in response to an interaction from the subject. Then, measuring a resulting motion due to activation of a muscle of the subject to produce motion measurements. Then, processing motion measurements to segregate them into a goal-directed segment that correlates with a first stimulus change produced by the artificial agent, and a supplemental segment associated with instances where the artificial agent does not produce any stimulus change. Then, calculating a first distance value based on the difference between a first statistical value derived from the motion measurements within a goal-directed segment and a second statistical value derived from the motion measurements within the supplemental segment. Then, determining a measure of a neurological disorder in the subject by comparing the first distance value with a second distance value for a different subject not diagnosed with the neurological disorder, the comparison performed automatically. Thereafter, displaying a measure of the neurological disorder on a display device.

In another embodiment, the level of neurological disorders identification in the individual, comprising the steps of collecting activity data from one or more Internet of Things (IoT) devices associated with the individual, wherein the IoT devices include wearable devices, sensors, or embedded devices, wherein the activity data includes motion data, physiological data, or environmental data. Then, processing the activity data to recognize patterns consistent with behaviors and symptoms of neurological disorders by analyzing the individual's activity over a predetermined period and recognizing deviations in the activity patterns using machine learning techniques that indicate transitions between different levels of neurological disorders. Then, comparing the recognized patterns with predefined behavioral templates corresponding to different levels of neurological disorders, wherein the predefined behavioral templates are derived from historical data of individuals diagnosed with neurological disorders. Then, determining the level of neurological disorders based on the comparison and generating a report based on the determined neurological disorders. Then, transmitting the report to a graphical user interface for review by a healthcare professional or caregiver. Thereafter, optimizing the sensitivity of the pattern recognition based on feedback from the individual or a healthcare professional and updating the predefined behavioral templates based on continuous learning from new activity data collected thereby providing suggestions or interventions to the individual based on the determined level of neurological disorders.

In another embodiment, alerting an individual patient of upcoming unusual or neurological disorders behavior, comprising the steps of monitoring body parameters of the patient using one or more Internet of Things (IoT) devices interconnected via a body area network, wherein the body parameters comprise heart rate, skin conductivity, temperature, and movement data. Then, analyzing the monitored body parameters using an artificial intelligence module to identify rapid changes indicative of upcoming unusual or neurological disorders behavior. Then, comparing the identified changes against predefined thresholds or patterns. Then, generating an alert to notify the patient upon determining an impending unusual or neurological disorders behavior based on the comparison, wherein the alert is communicated via visual, auditory, or tactile means. Then, correlating the rapid change in body parameters with external stimuli or events to identify potential triggers for the unusual or neurological disorders behavior. Thereafter, providing recommendations or interventions to the patient upon detecting an impending unusual or neurological disorders behavior.

In another embodiment, entertaining and engaging an individual patient predicted to exhibit upcoming unusual or neurological disorders behavior, the method comprising the steps of detecting triggering events and circumstances associated with the behavior, wherein the triggering events and circumstances are detected based on real-time behavior information data generated by a playing ball (3) used by the patient. Then, determining a specific set of activities tailored to the detected triggering events and circumstances, wherein the determination of the specific set of activities involves an artificial intelligence module trained to match activities to detected triggering events and circumstances. Then, initiating one or more of the activities from the set, comprising: listening to music, playing games, or engaging in a conversation with an AI chatbot, wherein the AI chatbot is designed to provide therapeutic interaction tailored to the needs of individuals with neurological disorders wherein the games are designed to promote relaxation, focus, or behavioral regulation consistent with the needs of individuals with neurological disorders and the music is selected based on its potential therapeutic effect on the patient. Then, monitoring the patient's response to the initiated activities. Then, adjusting the specific set of activities based on feedback received from the patient or observed outcomes, wherein the AI chatbot is programmed to recognize signs of distress or agitation in the patient's communication and adjust its interaction strategy accordingly.

Figure 3:
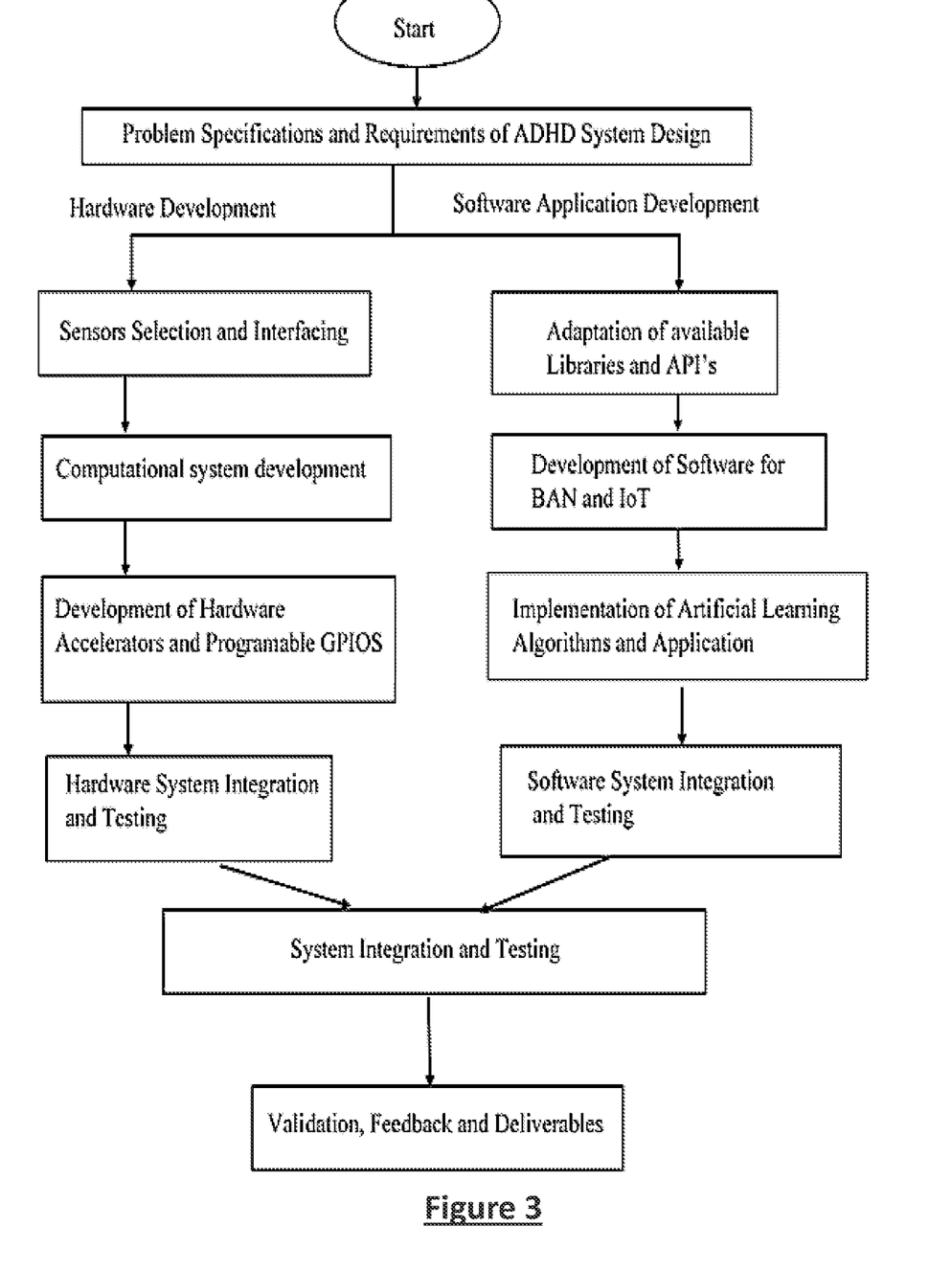
FIG. 3 illustrates a complete system architecture containing hardware and software of the methodology used to obtain results in accordance with an embodiment of the present disclosure.

FIG. 3 illustrates a complete system architecture containing hardware and software of the methodology used to obtain results in accordance with an embodiment of the present disclosure. The system offers an interactive tool for users from Neurologically challenged communities to play, learn, and at the same time recognition of their behavioral patterns to create alerts for supervision and support. The system has two modules a) an interactive module to select the activity and engage the user and b) an observation module (116) to analyze the behavioral pattern and progress in the activity in which the user is engaged. This solution offers users to perform daily activities while the attendee/supervisor needs not to be present every time. This work helps in the early recognition of trigger/panic moments in such users attention/support will be provided in the early levels. The implementation of learning techniques will help in data analysis in real time. The log generation will be presented using a mobile application that can be shared with the diagnostic facility based on user privileges.

The User-Friendlys the following solution:
1. Early recognition of symptoms: this will help to control the behavioral changes so they can be controlled in their initial levels
2. User-Friendly Identification of the Symptoms: By using recent advancements in IoT and Activity recognition, it is possible to easily identify the level of ADD/ADHD/Autism if present.
3. Diagnosis of the triggering events and circumstances due to the ADD/ADHD/Autism triggers in an individual patient. This can be due to different reasons for different patients.
4. Entertainment and Engaging the user with an Activity system for such age group The developed system promotes an early and easy-to-use platform for the identification of ADD/ADHD/Autism symptoms using Information and Communication Technology. The system is used to monitor the activities of users to analyze and distinguish between normal behavior and ADD/ADHD/Autism behavior. The system is used to provide a system that will help in diagnosis through activity recognition using Artificial Intelligence, IoT, and Body Area Networks. The system is used to provide low-cost solutions for the detection, recognition, and logging of behavioral patterns to prevent and detect ADD/ADHD/Autism at an early levels. A learning Platform for Early age communities having such neurological issues. A single easy-to-access platform for ADD/ADHD/Autism recognition and prevention. Development of a low-cost portable System that can detect ADD/ADHD/Autism and generate the alert. Artificial Intelligence-based solution for system development that can work with or without handheld devices. Activity log generation and trigger moments detection for ADHD patients using IoT and Body Area Network.

In this system, different patients (subjects) have been taken to organize the efficient dataset to train the framework for ADHD diagnosis. Data has been segregated in a 70-30% ratio for training and testing. The live images are pre-processed and features are extracted for classification. The accuracy parameters have been calculated after the analysis through multiple models. The results are stored on a cloud server (118) for further access through medical experts and patients. The data can be used and secured for further clinical trials through multiple health centers. The proposed iPAL would be able to diagnose ADHD after the training and testing. The main advantage of the proposed framework is that this would be a faster, more reliable, and low-cost solution as there would be a low cost to justify the mental disorder through iPAL and the framework would be accessible to the patients and doctors at remote locations. So, it will be much faster and more reliable comparatively.

Based on symptoms, the brain images will be captured and processed through a computing model, which will be already trained and tested through the samples. The results would be available in terms of the status of disorders. The results status would be updated to medical experts, who is an available at remote locations and connected through the internet servers. The medical experts would be available to the patients for counseling according to their preferred time. The data would be available on the cloud server (118), which can be accessed by users, medical staff, and experts for treatment and clinical studies.

Figure 4:
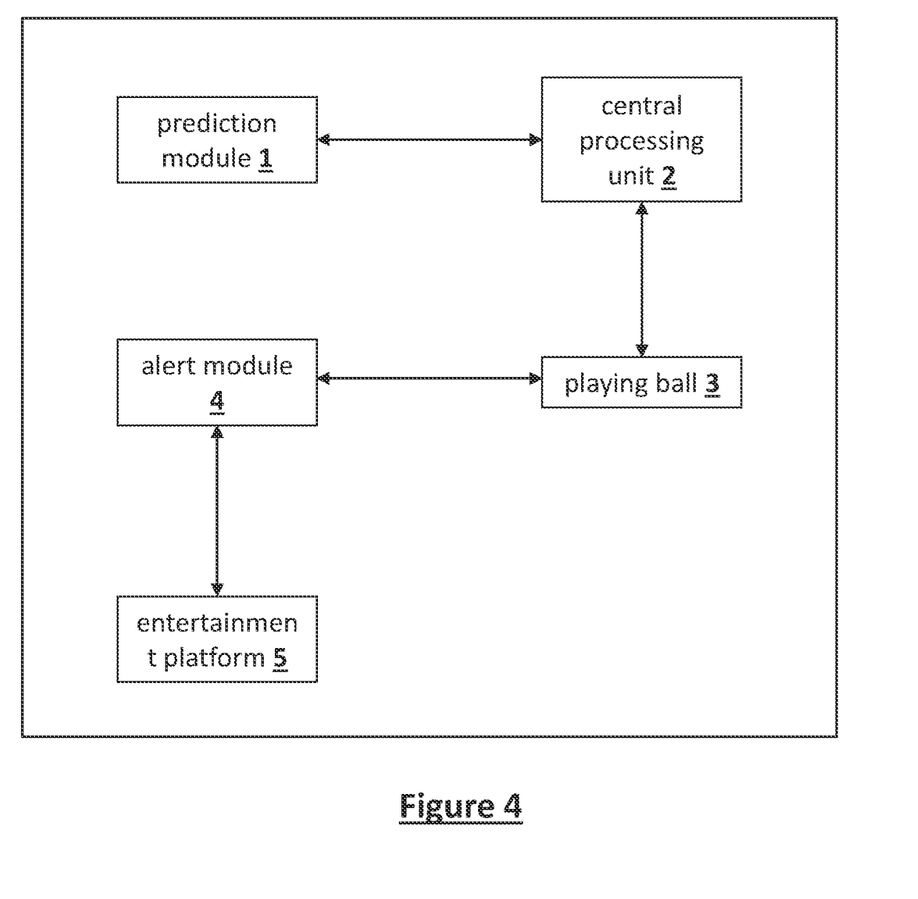
FIG. 4 illustrates a block diagram of a machine learning-based smart healthcare system for monitoring behavioral patterns in individuals with neurological disorders in accordance with an embodiment of the present disclosure.

FIG. 4 illustrates a block diagram of a machine learning-based smart healthcare system for monitoring behavioral patterns in individuals with neurological disorders in accordance with an embodiment of the present disclosure. The system includes a prediction module (1) equipped with artificial intelligence to predict neurological disorders in an individual patient using a machine learning technique and identify a level of neurological disorders by using an Internet of Things (IoT) and activity recognition.

In an embodiment, a central processing unit (2) is connected to the prediction module (1) to detect triggering events and circumstances due to which the neurological disorders trigger in an individual patient upon receiving real-time behavior information data generated by a playing ball (3) of an individual patient and distinguish between a normal behavior and a neurological disorders behavior using a central processing unit, wherein the playing ball (3) coupled to the central processing unit (2) has at least 8 different color faces that glow by an audio command input given through a microphone, wherein the playing ball (3) is able to perform a set of activities by the audio command, wherein the set of activities includes jump, locomote, replying questions, and talking, wherein the playing ball (3) having an embedded computer comprises a microphone to receive audio commands.

In one embodiment, a speaker is used to respond to the asked questions and talk with the patient.

In one embodiment, an accelerometer is used to locomote the playing ball (3) body.

In one embodiment, a pressure sensor is used to determine the pressure applied on the playing ball (3) body to analyze the behavioral pattern of the patient.

In one embodiment, a processor is used to generate real-time behavior information data and sending the information data to the alert module (4) via a Wi-Fi module or Bluetooth.

In an embodiment, an alert module (4) is in association with the central processing unit (2) to alert the individual patient upon determining neurological disorders behavior using an artificial intelligence, an IoT, and a body area network, wherein neurological disorders behavior is determined by identifying a rapid change in body parameters of the patient.

In an embodiment, an entertainment platform (5) is in connection with the central processing unit (2) and alert module (4) to entertain and engage the individual patient with a specific set of activities assigned according to detected triggering events and circumstances upon determining the neurological disorders behavior, wherein a specific set of activities includes listening to music, playing games, and talking to an AI chatbot.

In another embodiment, the prediction unit comprises an input unit (102) for importing phenotypic and fMRI image data and dividing healthy and patient data.

In one embodiment, a pre-processing unit (104) is used for filtering noise from the imported phenotypic and fMRI image data.

In one embodiment, a segregation unit (106) is used for segregating images from noise data and checking whether data is segregated or not, and if not, segregating data for refiltering.

In one embodiment, an extraction unit (108) is used for extracting a set of features by applying logistic regression and examining the coefficients thereby a probabilistic and statistical analysis is performed to extract the ROIs, i.e., voxels that are temporarily correlated and are active, wherein the probabilistic and statistical analysis is preferably an Independent Component Analysis (ICA).

In one embodiment, a controlling unit (110) is used for measuring the functional connectivity biomarkers using the correlation connectivity measure in the form of correlation matrices, wherein the functional connectivity refers is calculated using the standard correlation measures.

In one embodiment, an optimized classifier (112) is used for classifying real-time fMRI and phenotypic data into a non-neurological disorders and neurological disorders category and early prediction of attention-deficit or hyperactivity disorder (ADHD) and its levels, wherein the neurological disorders are selected from a group of Attention-Deficit Disorder (ADD), Attention-Deficit or Hyperactivity Disorder (ADHD), and autism spectrum disorder (ASD), wherein the fMRI data is processed using the Neural Network, and the phenotypic are processed using the classifier, wherein the correlation matrix developed using functional connectivity as the connectivity biomarker is used as input data for the neural network.

In another embodiment, a cloud server (118) for storing the classified fMRI and phenotypic data into a category and used biomarkers for early prediction, which is accessed in future predictions through the medical experts and patients for similar cases, wherein the cloud server (118) further stores ADHD-200 dataset consists of two types of data, the personal characteristic data and the MRI (Magnetic Resonance Image) data consisting of a resting-state functional magnetic resonance image (rs-fMRI) and a structural magnetic resonance image (s-MRI).

In another embodiment, the entertainment platform (5) assigns a specific set of entertaining and engaging activities to the individual patient upon predicting triggering events and circumstances that predict the onset of unusual or neurological disorders behavior in the individual patient, wherein the entertainment platform (5) further comprises an evaluation module associated with assessing the effectiveness of the assigned activities in managing the symptoms of neurological disorders in the individual patient based on the patient's engagement and response to the assigned activities.

In one embodiment, a feedback module is coupled with the evaluation module, wherein the feedback module is configured to adjust the assigned activities based on the effectiveness assessed by the evaluation module.

In another embodiment, the inactive or noisy voxels are removed and time series using a fit transform method is extracted to obtain functional connectivity, wherein each voxel has some fMRI signal associated with it, which is a blood-oxygen-level-dependent (BOLD) signal and plotting the signals of a voxel against the time is called a time series, wherein the time series provide further functional connectivity computation data, potentially allowing machine learning applications, wherein the optimized classifier (112) is developed using the functional connectivity biomarkers, wherein the functional connectivity refers to undirected coupling strength between voxels or regions, usually calculated using the standard correlation measures.

In another embodiment, the system further comprises a graphical user interface (114) is having an interactive module to select the activity and engage the user, wherein the activity includes playing music, creative arts, algebra, play games, glow color and words.

In one embodiment, an observation module (116) is used to analyze a behavioral pattern using a learning technique and progress in the activity in which the user is engaged for early recognition of upcoming unusual or neurological disorders behavior in such users to attention or support.

In one embodiment, a log or report generation module is used for generating a log or report of the recognized upcoming unusual or neurological disorders behavior.

In one embodiment, a level selection module is used for selecting a level of activities ranging from 1-4, where 1 is minimum and 4 is maximum.

In one embodiment, a data analysis and event detection module is used for determining the involvement of each patient and their continuity on a daily basis.

In another embodiment, a device is used for identifying neurological disorders symptoms using an information and communication technology comprises a camera for capturing brain images.

In one embodiment, a plurality of sensors is used for monitoring a set of activities of a user to analyze and distinguish between normal behavior and neurological disorders behavior.

In one embodiment, a communication device is used for ensuring wireless connection with the system for the detection, recognition, and log of behavioral patterns to prevent and detect neurological disorders at an early level using Artificial Intelligence, IoT, and Body Area Networks.

In another embodiment, the data is extracted for each subject and then concatenated to form a distinguished dataset for input data, wherein a phenotypic dataset is analyzed further for a plurality of subjects and features, namely Site, Gender, Age, Handedness, ADHD, ADHD Measure, Inattentive, Hyper or Impulsive, IQ Measure, Verbal IQ, Performance IQ, Full IQ, and Medicine Status, leading to the elimination of the features containing more than 60% null or not defined values, followed by dropping the remaining rows with null values from the dataset, wherein the fMRI data is in the form of a 4D nifti image file with noise variables removed, wherein in a 4D nifti image, the first three dimensions represent the three coordinates of a 3D space, i.e., x, y, and z, and the 4th dimension represents time, wherein the 4D image is a collection of several 3D images corresponding to each unit of time such that the 3D image represents voxels, just like a 2D image represents pixels, wherein the fit transform method is used to extract the time series, which is further used to obtain functional connectivity upon removing the noisy voxels and extracting the ROIs, wherein the mapping of the functional connectivity matrices onto a brain image where each node represents an ROI and edges represent the time-synchronized connectivity between the ROIs with edge strength of more than 80% to obtain the functional connectivity maps or functional connectome, wherein the ANN (Artificial neural network) is used for training the classifier, wherein a Sequential Neural Network is trained as the ANN, wherein the Sequential Neural Network is having an input size of thirteen dimensions and five dense layers are added with dimension and activation functions, wherein the Sequential Neural Network model is compiled using loss function, optimizer, and metric of accuracy, wherein after training the neural network model with a max epoch count of one hundred, the prediction is made, and the result is converted into an array back from One-Hot-Encoded format, wherein for both the fMRI and the phenotypic, the features are processed through a Min-Max Scaler separately and the diagnosis of ADHD is converted into binary form, whereas the phenotypic file had ADHD of four types, wherein the SVM is optimized using Grid Search to predict best-fit parameters.

In another embodiment, an EEG sensor is worn on a patient's head for monitoring one or more physiological signals originating from a patient and observing the sleep state of the patient, extracting one or more predictive parameters from the monitored physiological signals, these parameters bearing relevance to the patient's future symptomatology, and subjecting the extracted parameters and the observed sleep state to an analytical process with the intent of forecasting the patient's future symptomatology, wherein the neuromodulation signal includes electrical stimulation delivered to a vagus nerve of the patient, wherein administering a therapeutic regimen to the subject, post-therapy, reverting back to and presenting on a display device an artificial agent to a subject, wherein the artificial agent produces a stimulus change to the subject when the subject interacts with the artificial agent to deduce a post-therapy metric indicative of the neurological disorder, and evaluating the degree of change between the pre-therapy measure and the post-therapy measure of the neurological disorder, thereby making a determination on whether the administered therapy has modulated the neurological disorder, this determination being contingent on the magnitude of the change observed.

In another embodiment, the level of ADD, ADHD, or ASD identification in the individual comprises one or more Internet of Things (IoT) devices to collect activity data associated with the individual, wherein the activity data includes motion data, physiological data, or environmental data.

In one embodiment, a pre-processing unit is used to process the activity data to recognize patterns consistent with behaviors and symptoms of ADD, ADHD, or ASD by analyzing the individual's activity over a predetermined period and recognizing deviations in the activity patterns using machine learning techniques that indicate transitions between different levels of ADD, ADHD, or ASD.

In one embodiment, a control unit is used to compare the recognized patterns with predefined behavioral templates corresponding to different levels of ADD, ADHD, or ASD and determine the level of ADD, ADHD, or ASD based on the comparison.

In one embodiment, a reporting module is configured to generate a report based on the determined level of ADD, ADHD, or ASD.

In one embodiment, a communication interface is used to transmit the report to the graphical user interface for review by a healthcare professional or caregiver and optimize the sensitivity of the pattern recognition based on feedback from the individual or a healthcare professional and update the predefined behavioral templates based on continuous learning from new activity data collected thereby providing suggestions or interventions to the individual based on the determined level of ADD, ADHD, or ASD.

In another embodiment, alerting an individual patient of upcoming unusual or neurological disorders behavior comprises one or more Internet of Things (IoT) devices interconnected via a body area network, configured to monitor body parameters of the patient, wherein the body parameters comprise heart rate, skin conductivity, temperature, and movement data.

In one embodiment, an artificial intelligence module is operably connected to the one or more IoT devices, configured to analyze the monitored body parameters to identify rapid changes indicative of upcoming unusual or neurological disorders behavior and compare the identified changes against predefined thresholds or patterns.

In one embodiment, an alert generation unit is operably connected to the artificial intelligence module, configured to generate an alert to notify the patient upon determining an impending unusual or neurological disorders behavior based on the comparison, wherein the alert is communicated via visual, auditory, or tactile means.

In one embodiment, a correlation unit is configured to correlate the rapid change in body parameters with external stimuli or events to identify potential triggers for the unusual or neurological disorders behavior.

In one embodiment, a recommendation module is operably connected to the alert generation unit and the correlation unit, configured to provide recommendations or interventions to the patient upon detecting an impending unusual or neurological disorders behavior.

In another embodiment, entertaining and engaging an individual patient predicted to exhibit upcoming unusual or neurological disorders behavior, the method comprising the steps of the playing ball sensor (3) configured to detect real-time behavior information data when used by the patient, enabling the detection of triggering events and circumstances associated with the behavior. The artificial intelligence module operatively connected to the playing ball sensor, configured to determine a specific set of activities tailored to the detected triggering events and circumstances, match activities to the detected triggering events and circumstances using training data, initiate one or more of the activities from the determined set, including listening to music, playing games, or engaging in a conversation with an AI chatbot, monitor the patient's response to the initiated activities, and adjust the specific set of activities based on feedback received from the patient or observed outcomes.

The AI chatbot component within the artificial intelligence module, configured to provide therapeutic interaction tailored to the needs of individuals with neurological disorders, recognize signs of distress or agitation in the patient's communication, and adjust its interaction strategy based on the recognition of the distress or agitation.

In one embodiment, a music module is connected to the artificial intelligence module, configured to select music based on its potential therapeutic effect on the patient.

In one embodiment, a gaming module is designed to promote relaxation, focus, or behavioral regulation consistent with the needs of individuals with neurological disorders, being operatively connected to the artificial intelligence module.

In another embodiment, the detection of the triggering event comprises the playing ball (3) equipped with sensors to generate real-time behavior information data based on the individual patient's interactions. The central processing unit (2) communicatively connected to receive the behavior information data, the central processing unit is configured to detect triggering events and circumstances leading to manifestations of neurological disorders in the patient based on the received data, wherein the triggering events and circumstances include variations in motion patterns, play dynamics, or interaction with the playing ball (3), and distinguish between normal behavior and neurological disorders behavior using the detected triggering events and circumstances. The central processing unit (2) further analyzes temporal patterns in the behavior information data to identify consistent or recurring triggers.

In another embodiment, the playing ball initiates continuous monitoring of the patient's behavior, cognitive responses, and physiological signals using a plurality of devices selected from heart rate monitors, skin conductance sensors, eye-tracking devices, audio-visual recording devices, and GPS trackers, while simultaneously collecting comprehensive data about the patient's environmental conditions and personal activities, utilizing tools including cameras for audio-visual data, social media tracking software for social interactions, academic or professional performance tracking systems, and fitness trackers for physical activities, which is followed by conducting an assessment of ADHD symptoms using a tool to track the occurrence, frequency, and severity of ADHD symptoms, including episodes of hyperactivity, impulsivity, and inattention, wherein an advanced correlational data analysis techniques are performed to associate the monitored behavior, cognitive responses, and physiological signals with the incidence of ADHD symptoms, identifying specific environmental, personal, or physiological factors consistently associated with these symptoms, subsequent to this, specific events that precede the onset of symptoms by a defined period are identified, which could include certain social interactions, specific tasks, or certain times of day, using event tracking software or apps, and controlled experiments or interventions are then conducted using virtual reality systems or simulation software to validate the triggering effect of the identified events on ADHD symptoms, involving exposure of the patient to the events in a controlled setting and observing whether symptoms are triggered, thereby therapeutic interventions are adjusted based on the identified triggering events, using cognitive behavioral therapy techniques, medication adjustments, or biofeedback devices, aiming to either reduce exposure to these events, or to enhance the patient's coping strategies when exposure is unavoidable.

Figure 5:
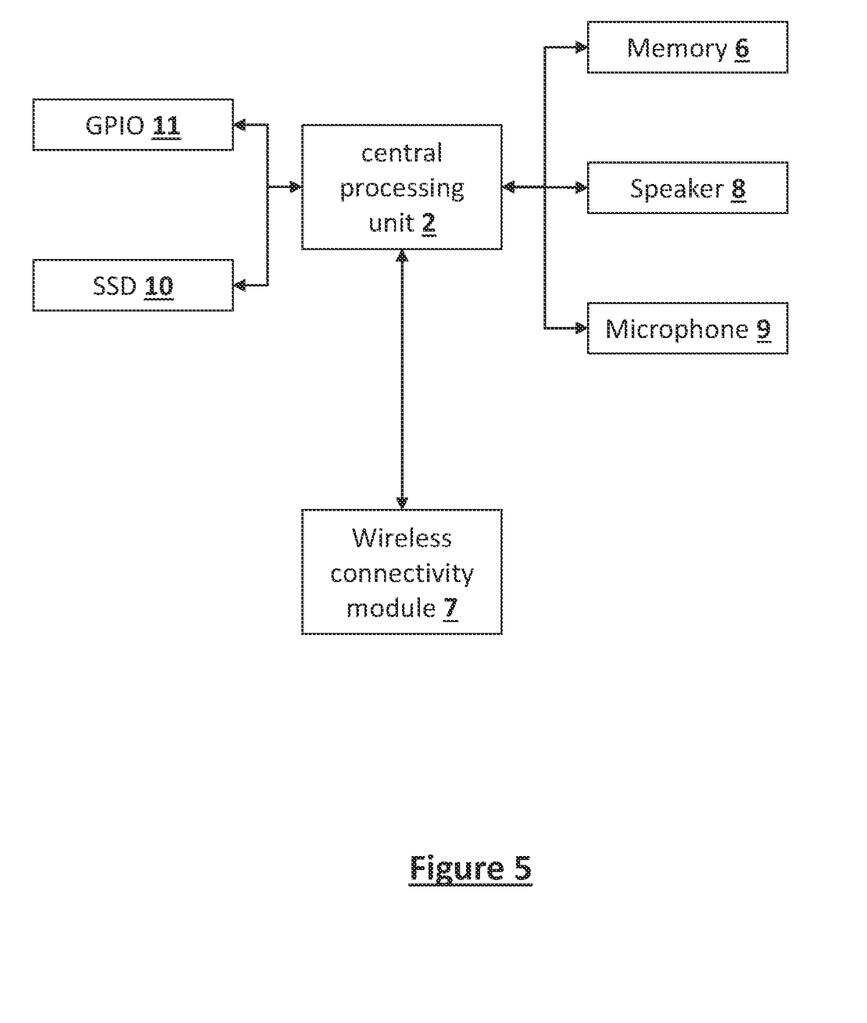
FIG. 5 illustrates the hardware architecture of the system in accordance with an embodiment of the present disclosure.

FIG. 5 illustrates the hardware architecture of the system in accordance with an embodiment of the present disclosure. The hardware includes the central processing unit (2), or the "brain" of the system, which is linked to a special prediction module (1). This module's job is to detect particular events or situations that could cause ADD/ADHD/Autism symptoms to appear in a specific person. It does this by analyzing real-time information about the person's behavior. This information comes from a unique playing ball (3) that the person uses. By comparing this data with what we know about typical behavior and the behavior associated with ADD/ADHD/Autism, the system can tell the difference between the two. This helps it understand when and why these symptoms might be triggered.

In one embodiment, a memory (6) is coupled to the CPU (2) includes Cache Memory used to temporarily store data that the CPU is likely to use again in the near future. It helps speed up the processing time because the CPU can access data from the cache much faster than it can from the main memory (RAM).

In one embodiment, a speaker (8) and a microphone (9) are coupled to the CPU (2) for allowing the patient to interact with the system and to give audio commands to the system.

In one embodiment, an SSD (10) is coupled to the CPU (2) for storing the instructions.

In one embodiment, a GPIO stands for General Purpose Input/Output. It's a type of pin found on an integrated circuit or a microcontroller like a Raspberry Pi or Arduino. A GPIO pin can be set to be either an input or an output pin, which is why it's called "general purpose." When a GPIO pin is set to "input," it can receive data from external devices. This is useful for sensing the state of a button, reading a temperature sensor, or similar tasks. When a GPIO pin is set to "output," it can send data or provide power to external devices. This can be used to turn an LED of the playing ball on and off.

The playing ball (3) connected to the central processing unit (2) is an interactive toy that has 8 different glowing color faces. These colors light up based on voice commands given through a microphone. With voice commands, the ball can perform activities such as jumping, moving around, answering questions, and even talking. The ball itself is quite smart; it has a mini-computer inside. This includes a microphone to listen to voice commands; a speaker so it can answer questions and chat with the user, an accelerometer to help it move; a pressure sensor to feel when it's being squeezed or pressed, which helps analyze the user's behavior; and a processor to generate real-time data about the user's behavior. This data is then sent to an alert module (4) using either Wi-Fi or Bluetooth. This ball is not just a fun toy, it's also a tool for understanding behavior.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Benefits, other advantages, and solutions to problems have been described above about specific embodiments. However, the benefits, advantages, solutions to problems, and any component(s) that may cause any benefit, advantage, or solution to occur or become more pronounced are not to be construed as a critical, required, or essential feature or component of any or all the claims.

The invention claimed is:

1. A smart healthcare method for monitoring behavioral patterns in individuals with neurological disorders, the method comprises:
predicting neurological disorders in an individual patient using a machine learning technique;
identifying a level of neurological disorders by using an Internet of Things (IoT) and activity recognition;
detecting triggering events and circumstances due to which the neurological disorders trigger in the individual patient upon receiving real-time behavior information data generated by a playing ball of an individual patient and distinguishing between a normal behavior and a neurological disorders behavior using a central processing unit; wherein detecting triggering events using the playing ball comprising the steps of:
providing the playing ball with a minimum of 8 distinct colored faces, each face being configured to illuminate in response to specific audio command inputs; capturing audio commands via an integrated microphone within the playing ball;
interpreting the audio commands to activate a set of activities, wherein the activities comprise causing the playing ball to jump, locomoting the playing ball using an embedded accelerometer, replying to questions posed by the patient, and engaging in verbal interactions with the patient;
employing a speaker within the playing ball to provide verbal responses to questions and engage in dialogues;
utilizing an embedded pressure sensor within the playing ball to measure the amount of force applied by the patient, thereby facilitating the analysis of the patient's behavioral patterns;
generating real-time behavior information data through an integrated processor, and transmitting the data to an alert module using either Wi-Fi or Bluetooth connectivity;
alerting the individual patient upon determining the neurological disorders behavior using an artificial intelligence, an IoT, and a body area network, wherein the neurological disorders behavior is determined by identifying a rapid change in body parameters of the patient; and
entertaining and engaging the individual patient with a specific set of activities assigned according to the detected triggering events and circumstances upon determining the neurological disorders behavior, wherein the specific set of activities includes listening to music, playing games, and talking to an AI chatbot.

2. The method of claim 1, wherein the neurological disorders are selected from a group of Attention-Deficit Disorder (ADD), Attention-Deficit or Hyperactivity Disorder (ADHD), and autism spectrum disorder (ASD), wherein the neurological disorders prediction comprises:
importing phenotypic and fMRI image data and dividing healthy and patient data;
filtering noise from the imported phenotypic and fMRI image data and storing the fMRI and phenotypic data into a non-neurological disorders and neurological disorders category in a cloud server and using biomarkers for future predictions through medical experts and patients for similar cases;
removing inactive or noisy voxels and extracting time series using a fit transform method to obtain functional connectivity after extracting ROIs;
segregating images from noise data and checking whether data is segregated or not, and if not, segregating data for refiltering;
extracting a set of features by applying logistic regression and examining the coefficients to perform a probabilistic and statistical analysis to extract the ROIs, wherein the probabilistic and statistical analysis is an Independent Component Analysis (ICA), wherein the set of features is selected from subject, site, age, sex, and gender;
measuring the functional connectivity using correlation connectivity measure in the form of correlation matrices, wherein the functional connectivity is calculated using the standard correlation measures, wherein at least three connectivity measures are considered to calculate the functional connectivity including correlation, partial correlation, and tangent, in which, first, the accuracies for these three measures are compared and the correlation and tangent are found to be similar and accurate enough; and developing an optimized classifier using the functional connectivity for classifying the fMRI and phenotypic data into the non-neurological disorders and neurological disorders category and early prediction of neurological disorders and its level, wherein the fMRI data is processed using a Neural Network, and the phenotypic are processed using a SVM (subject vector machine).

3. The method of claim 1, wherein determining the neurological disorder upon detecting triggering events using visual presentation comprises:

presenting an artificial agent on a display device to the patient, wherein the artificial agent is configured to produce a stimulus change in response to an interaction from the subject;

measuring a resulting motion due to activation of a muscle of the patient to produce motion measurements;

processing motion measurements to segregate them into a goal-directed segment that correlates with a first stimulus change produced by the artificial agent, and a supplemental segment associated with instances where the artificial agent does not produce any stimulus change;

calculating a first distance value based on the difference between a first statistical value derived from the motion measurements within a goal-directed segment and a second statistical value derived from the motion measurements within the supplemental segment;

determining a measure of a neurological disorder in the subject by comparing the first distance value with a second distance value for a different patient not diagnosed with the neurological disorder, the comparison performed automatically; and displaying a measure of the neurological disorder on the display device.

4. The method of claim 1, wherein the level of neurological disorders identification in the individual comprising the steps of:

collecting activity data from one or more Internet of Things (IoT) devices associated with the individual, wherein the IoT devices include sensors, wherein the activity data includes motion data, physiological data, or environmental data;

processing the activity data to recognize patterns consistent with behaviors and symptoms of neurological disorders by:

a. analyzing the individual's activity over a predetermined period;

b. recognizing deviations in the activity patterns using machine learning techniques that indicate transitions between different levels of neurological disorders;

comparing the recognized patterns with predefined behavioral templates corresponding to different levels of neurological disorders, wherein the predefined behavioral templates are derived from historical data of individuals diagnosed with neurological disorders;

determining the level of neurological disorders based on the comparison and generating a report based on the determined neurological disorders;

transmitting the report to a graphical user interface for review by a healthcare professional or caregiver; and optimizing the sensitivity of the pattern recognition based on feedback from the individual or the healthcare professional and updating the predefined behavioral templates based on continuous learning from new activity data collected thereby providing suggestions or interventions to the individual based on the determined level of neurological disorders.

5. The method of claim 1, wherein alerting an individual patient of upcoming unusual or neurological disorders behavior comprising the steps of:

monitoring body parameters of the patient using one or more Internet of Things (IoT) devices interconnected via a body area network, wherein the body parameters comprise heart rate, skin conductivity, temperature, and movement data;

analyzing the monitored body parameters using an artificial intelligence to identify rapid changes indicative of upcoming unusual or neurological disorders behavior;

comparing the identified changes against predefined thresholds or patterns;

generating an alert to notify the patient upon determining the upcoming unusual or neurological disorders behavior based on the comparison, wherein the alert is communicated via visual, auditory, or tactile means;

correlating the rapid changes in body parameters with external stimuli or events to identify potential triggers for the unusual or neurological disorders behavior; and providing recommendations or interventions to the patient upon detecting the upcoming unusual or neurological disorders behavior.

6. The method of claim 1, wherein entertaining and engaging the individual patient predicted to exhibit upcoming unusual or neurological disorders behavior comprising the steps of:

detecting the triggering events and circumstances associated with the behavior, wherein the triggering events and circumstances are detected based on the real-time behavior information data generated by the playing ball used by the patient;

determining the specific set of activities tailored to the detected triggering events and circumstances, wherein the determination of the specific set of activities involves artificial intelligence trained to match activities to the detected triggering events and circumstances;

initiating one or more of the activities from the specific set, comprising: listening to music, playing games, or engaging in a conversation with an AI chatbot, wherein the AI chatbot is designed to provide therapeutic interaction tailored to the needs of individuals with neurological disorders wherein the games are designed to promote relaxation, focus, or behavioral regulation consistent with the needs of individuals with neurological disorders and the music is selected based on its potential therapeutic effect on the patient;

monitoring the patient's response to the initiated activities;

adjusting the specific set of activities based on feedback received from the patient or observed outcomes; and wherein the AI chatbot is programmed to recognize signs of distress or agitation in the patient's communication and adjust its interaction strategy accordingly.

7. A smart healthcare system for monitoring behavioral patterns in individuals with neurological disorders, the system comprises:

a prediction module equipped with artificial intelligence to predict neurological disorders in an individual patient using a machine learning technique and identify a level of neurological disorders by using an Internet of Things (IoT) and activity recognition;

a central processing unit connected to the prediction module to detect triggering events and circumstances due to which the neurological disorders trigger in the individual patient upon receiving real-time behavior information data generated by a playing ball of the individual patient and distinguish between a normal behavior and a neurological disorders behavior using the central processing unit;

the playing ball coupled to the central processing unit has at least 8 different color faces that glow by an audio command input given through a microphone, wherein the playing ball is able to perform a set of activities by the audio command, wherein the set of activities includes jump, locomote, replying to questions, and talking, wherein the playing ball having an embedded computer comprises:

a microphone to receive audio commands;

a speaker to respond to the questions and talk with the patient;

an accelerometer to locomote the playing ball;

a pressure sensor to determine the pressure applied on the playing ball to analyze the behavioral patterns of the patient;

a processor to generate real-time behavior information data and sending the information data to an alert module via Wi-Fi or Bluetooth;

the alert module in association with the central processing unit to alert the individual patient upon determining neurological disorders behavior using an artificial intelligence, an IoT, and a body area network, wherein the neurological disorders behavior is determined by identifying a rapid change in body parameters of the patient; and an entertainment platform in connection with the central processing unit and alert module to entertain and engage the individual patient with a specific set of activities assigned according to the detected triggering events and circumstances upon determining the neurological disorders behavior, wherein the specific set of activities includes listening to music, playing games, and talking to an AL chatbot.

8. The system of claim 7, wherein the prediction unit comprises:

an input unit for importing phenotypic and fMRI image data and dividing healthy and patient data;

a pre-processing unit for filtering noise from the imported phenotypic and fMRI image data;

a segregation unit for segregating images from noise data and checking whether data is segregated or not, and if not, segregating data for refiltering;

an extraction unit for extracting a set of features by applying logistic regression and examining coefficients to perform a probabilistic and statistical analysis to extract ROIs, wherein the probabilistic and statistical analysis is an Independent Component Analysis (ICA);

a controlling unit for measuring functional connectivity biomarkers using correlation connectivity measure in the form of correlation matrices, wherein functional connectivity refers is calculated using the standard correlation measures;

an optimized classifier for classifying the fMRI and phenotypic data into a non-neurological disorders and neurological disorders category and early prediction of attention-deficit or hyperactivity disorder (ADHD) and its levels, wherein the neurological disorders are selected from a group of Attention-Deficit Disorder (ADD), Attention-Deficit or Hyperactivity Disorder (ADHD), and autism spectrum disorder (ASD); and wherein the fMRI data is processed using a Neural Network, and the phenotypic are processed using the classifier, wherein the correlation matrices are developed using the functional connectivity as a connectivity biomarker is used as input data for the neural network.

9. The system of claim 8, wherein a cloud server for storing the classified fMRI and phenotypic data into a category and used biomarkers for early prediction, which is accessed in future predictions through medical experts and patients for similar cases, wherein the cloud server further stores a dataset consisting of two types of data, personal characteristic data and MRI (Magnetic Resonance Image) data consisting of a resting-state functional magnetic resonance image (rs-fM4RI) and a structural magnetic resonance image_(s-MRI).

10. The system of claim 8, wherein the entertainment platform assigns the specific set of entertaining and engaging activities to the individual patient upon predicting the triggering events and circumstances that predict the onset of unusual or neurological disorders behavior in the individual patient, wherein the entertainment platform further comprises:

an evaluation module associated with assessing the effectiveness of the assigned activities in managing the symptoms of neurological disorders in the individual patient based on the patient's engagement and response to the assigned activities; and a feedback module coupled with the evaluation module, wherein the feedback module is configured to adjust the assigned activities based on the effectiveness assessed by the evaluation module.

11. The system of claim 8, wherein inactive or noisy voxels are removed and time series using a fit transform method is extracted to obtain the functional connectivity, wherein each voxel has some fMRI signal associated with it, which is a blood-oxygen-level-dependent (BOLD) signal and plotting signals of a voxel against the time is called a time series, wherein the time series provide further functional connectivity computation data, allowing machine learning applications, wherein the optimized classifier is developed using the functional connectivity biomarkers, wherein the functional connectivity refers to undirected coupling strength between voxels or regions, calculated using the standard correlation measures.

12. The system of claim 8, further comprises a device for identifying neurological disorders symptoms using an information and communication technology comprising:

a camera for capturing brain images;

a plurality of sensors for monitoring a set of activities of the patient to analyze and distinguish between normal behavior and neurological disorders behavior; and a communication device for ensuring wireless connection with the system for the detection, recognition, and log of behavioral patterns to prevent and detect neurological disorders at an early level using Artificial Intelligence, IoT, and Body Area Networks.

13. The system of claim 8, wherein the data is extracted for each subject and then concatenated to form a distinguished dataset for input data, wherein a phenotypic dataset is analyzed further for a plurality of subjects and features, namely Site, Gender, Age, Handedness, ADHD, ADHD Measure, Inattentive, Hyper or Impulsive, IQ Measure, Verbal IQ, Performance IQ, Full IQ, and Medicine Status, leading to the elimination of the features containing more than 60% null or not defined values, followed by dropping the remaining rows with null values from the dataset, wherein the fMRI data is in the form of a 4D nifti image file with noise variables removed, wherein in a 4D nifti image, the first three dimensions represent the three coordinates of a 3D space, x, y, and z, and the 4th dimension represents time, wherein the 4D image is a collection of several 3D images corresponding to each unit of time such that the 3D images represent voxels, just like a 2D image represents pixels, wherein the fit transform method is used to extract the time series, which is further used to obtain functional connectivity upon removing noisy voxels and extracting the ROIs, wherein the measuring of the functional connectivity matrices onto a brain image where each node represents an ROI and edges represent the time-synchronized connectivity between the ROIs with edge strength of more than 80% to obtain functional connectivity maps or functional connectivity, wherein the ANN (Artificial neural network) is used for training the classifier, wherein a Sequential Neural Network is trained as the ANN, wherein the Sequential Neural Network is having an input size of thirteen dimensions and five dense layers are added with dimension and activation functions, wherein the Sequential Neural Network model is compiled using loss function, optimizer, and metric of accuracy, wherein after training the neural network model with a max epoch count of one hundred, the prediction is made, and the result is converted into an array back from One-Hot-Encoded format, wherein for both the fMRI and the phenotypic, features are processed through a Min-Max Scaler separately and the diagnosis of ADHD is converted into binary form, whereas a phenotypic file had ADHD of four types, wherein a SVM is optimized using Grid Search to predict best-fit parameters.

14. The system of claim 8, wherein the level of ADD, ADHD, or ASD identification in the individual comprises: one or more Internet of Things (IoT) devices to collect activity data associated with the individual, wherein the activity data includes motion data, physiological data, or environmental data;
  the pre-processing unit to process the activity data to recognize patterns consistent with behaviors and symptoms of ADD, ADHD, or ASD by:
    a. analyzing the individual's activity over a predetermined period;
    b. recognizing deviations in the activity patterns using machine learning techniques that indicate transitions between different levels of ADD, ADHD, or ASD;
  the controlling unit to compare the recognized patterns with predefined behavioral templates corresponding to different levels of ADD, ADHD, or ASD and determine the level of ADD, ADHD, or ASD based on the comparison;
  a reporting module configured to generate a report based on the determined level of ADD, ADHD, or ASD; and
  a communication interface to transmit the report to a graphical user interface for review by a healthcare professional or caregiver and optimize the sensitivity of the pattern recognition based on feedback from the individual or a healthcare professional and update the predefined behavioral templates based on continuous learning from new activity data collected thereby providing suggestions or interventions to the individual based on the determined level of ADD, ADHD, or ASD.

15. The system of claim 7, further comprises a graphical user interface having an interactive module to select the activity and engage the patient, wherein the activity includes playing music, creative arts, algebra, play games, glow color and words;
  an observation module to analyze a behavioral pattern using a learning technique and progress in the activity in which the patient is engaged for early recognition of upcoming unusual or neurological disorders behavior in such users to attention or support; a log or report generation module for generating a log or report of the recognized upcoming unusual or neurological disorders behavior; a level selection module for selecting a level of activities ranging from 1-4, where 1 is minimum and 4 is maximum; and a data analysis and event detection module for determining the involvement of each patient and their continuity on a daily basis.

16. The system of claim 7, wherein an EEG sensor is configured to be worn on the patient's head for monitoring one or more physiological signals originating from a patient and observing the sleep state of the patient, extracting one or more predictive parameters from the monitored physiological signals, these parameters bearing relevance to the patient's future symptomatology, and subjecting the extracted parameters and the observed sleep state to an analytical process with the intent of forecasting the patient's future symptomatology, wherein a neuromodulation signal includes electrical stimulation delivered to a vagus nerve of the patient, wherein administering a therapeutic regimen to the patient, post-therapy, reverting back to and presenting on a display device an artificial agent to a patient, wherein the artificial agent produces a stimulus change to the patient when the patient interacts with the artificial agent to deduce a post-therapy metric indicative of the neurological disorder, and evaluating the degree of change between the pre-therapy measure and the post-therapy measure of the neurological disorder, thereby making a determination on whether the administered regimen has modulated the neurological disorder, this determination being contingent on the magnitude of the change observed.

17. The system of claim 7, wherein alerting to the individual patient of upcoming unusual or neurological disorders behavior comprises:
  one or more Internet of Things (IoT) devices interconnected via a body area network, configured to monitor body parameters of the patient, wherein the body parameters comprise heart rate, skin conductivity, temperature, and movement data;
  an artificial intelligence module operably connected to the one or more IoT devices, configured to analyze the monitored body parameters to identify rapid changes indicative of upcoming unusual or neurological disorders behavior and compare the identified changes against predefined thresholds or patterns;
  an alert generation unit operably connected to the artificial intelligence module, configured to generate an alert to notify the patient upon determining the upcoming unusual or neurological disorders behavior based on the comparison, wherein the alert is communicated via visual, auditory, or tactile means;
  a correlation unit configured to correlate the rapid change in body parameters with external stimuli or events to identify potential triggers for the unusual or neurological disorders behavior; and
  a recommendation module operably connected to the alert generation unit and the correlation unit, configured to provide recommendations or interventions to the patient upon detecting the upcoming unusual or neurological disorders behavior.

18. The system of claim 7, further comprising:
  the playing ball configured to detect the real-time behavior information data when used by the patient, enabling the detection of triggering events and circumstances associated with the behavior;

an artificial intelligence module operatively connected to the playing ball sensor, configured to:
i. determine the specific set of activities tailored to the detected triggering events and circumstances;
ii. ii. match activities to the detected triggering events and circumstances using training data;
iii. iii. initiate one or more of the activities from the determined set, including listening to music, playing games, or engaging in a conversation with an AI chatbot;
iv. iv. monitor the patient's response to the initiated activities; and
v. v. adjust the specific set of activities based on feedback received from the patient or observed outcomes;

the AI chatbot component within the artificial intelligence module, configured to:
i. provide therapeutic interaction tailored to the needs of individuals with neurological disorders;
ii. recognize signs of distress or agitation in the patient's communication;
iii. adjust its interaction strategy based on the recognition of the distress or agitation;

a music module connected to the artificial intelligence module, configured to select music based on its potential therapeutic effect on the patient; and a gaming module designed to promote relaxation, focus, or behavioral regulation consistent with the needs of individuals with neurological disorders, being operatively connected to the artificial intelligence module.

19. The system of claim 7, wherein the detection of the triggering events comprises:
the playing ball equipped with sensors to generate real-time behavior information data based on the individual patient's interactions;
the central processing unit communicatively connected to receive the behavior information data, the central processing unit is configured to:
i. detect triggering events and circumstances leading to manifestations of neurological disorders in the patient based on the received data, wherein the triggering events and circumstances include variations in motion patterns, play dynamics, or interaction with the playing ball;
ii. ii. distinguish between normal behavior and neurological disorders behavior using the detected triggering events and circumstances; and
wherein the central processing unit further analyzes temporal patterns in the behavior information data to identify consistent or recurring triggers.

20. The system of claim 7, wherein the playing ball initiates continuous monitoring of the patient's behavior, cognitive responses, and physiological signals using a plurality of devices selected from heart rate monitors, skin conductance sensors, eye-tracking devices, audio-visual recording devices, and GPS trackers, while simultaneously collecting comprehensive data about the patient's environmental conditions and personal activities, utilizing tools including cameras for audio-visual data, social media tracking software for social interactions, academic or professional performance tracking systems, and fitness trackers for physical activities, which is followed by conducting an assessment of ADHD symptoms using a tool to track the occurrence, frequency, and severity of ADHD symptoms, including episodes of hyperactivity, impulsivity, and inattention, wherein an advanced correlational data analysis techniques are performed to associate the monitored behavior, cognitive responses, and physiological signals with the incidence of ADHD symptoms, identifying specific environmental, personal, or physiological factors consistently associated with these symptoms, subsequent to this, specific events that precede the onset of symptoms by a defined period are identified, which could include certain social interactions, specific tasks, or certain times of day, using event tracking software or apps, and controlled experiments or interventions are then conducted using virtual reality systems or simulation software to validate the triggering effect of the identified events on ADHD symptoms, involving exposure of the patient to the events in a controlled setting and observing whether symptoms are triggered, thereby therapeutic interventions are adjusted based on the identified triggering events, using cognitive behavioral therapy techniques, medication adjustments, or biofeedback devices, aiming to either reduce exposure to these events, or to enhance the patient's coping strategies when exposure is unavoidable.

* * * * *